Patented Mar. 2, 1954

2,671,090

UNITED STATES PATENT OFFICE 2,671,090

PURIFICATION OF PHTHALIC ANHYDRIDE

Mathew L. Kalinowski, Chicago, Ill., and Frederick Haviland MacLaren, Munster, Ind., assignors to Standard Oil Company, Chicago, Ill., a corporation of Indiana No Drawing. Application October 28, 1950,
Serial No. 192,822

9 Claims. (Cl. 260—346.7)

This invention relates to the purification of phthalic anhydride that is manufactured by the catalytic vapor phase oxidation of aromatic compounds such, for example, as naphthalene and orthoxylene.

The well known process of manufacture of phthalic anhydride by vapor phase oxidation of naphthalene, methyl naphthalene, or orthoxylene over a catalyst, usually a vanadium oxide catalyst, provides a crude phthalic anhydride contaminated with unreacted constituents, totally burned products, maleic anhydride, and to a considerably lesser degree organic acids and traces of other organic compounds. Depending upon such variables as the purity of the feed reactant and the activity of the catalyst, the unreacted constituent and the maleic anhydride can each be present in the product in a proportion as high as about 25%. Under conditions of low temperature and low relative air supply the impurities are naphthoquinone and unreacted naphthalene; however, under the usual optimum operating conditions maleic anhydride is the principal impurity with traces of other organic acids.

The commercial value and utility of phthalic anhydride and the need for high purity in most of the processes utilizing it have created a need for purification of crude phthalic anhydride and have produced several methods for accomplishing this. Many of these substantially reduce the obtainable yield of phthalic anhydride. A major employment of phthalic anhydride is in the synthesis of alkyd resins. This provides an excellent example of a process in which there is required a pure phthalic anhydride particularly as defined by freedom from maleic anhydride. Substantially pure phthalic anhydride, that is, phthalic anhydride containing less than about 2% by weight and preferably less than about 1% by weight of maleic anhydride, can be employed in alkyd resin synthesis, but higher contents of maleic anhydride form brittle and high-free-acid resins.

A primary object of the present invention is the provision of an improved process for purifying phthalic anhydride. Another object of the invention is the provision of an improved process of purifying phthalic anhydride without substantially decreasing the yield thereof. Yet another object of the invention is the provision of a process for removing maleic anhydride from phthalic anhydride and thereby producing a substantially pure phthalic anhydride suitable for use in alkyd resins manufacture. The invention has for other objects such other advantages or results as will appear in the specification and in the claims.

Briefly stated, the present invention comprises the admixture of crude phthalic anhydride with asphalt or the asphaltinic constituent of asphalt, heating the same at a temperature between 65° and 260° C., and subsequently distilling purified phthalic anhydride from the admixture at a temperature between 120° and 260° C. under subatmospheric pressure. The maleic anhydride constituent is particularly effectively removed; it appears to form a high boiling adduct or reaction product with certain constituents of the asphalt so that upon sublimation of the phthalic anhydride a substantially pure product will be obtained. An increased rate of treatment and an even purer product can be provided by the addition to the said admixture of asphalt and phthalic anhydride, or to the asphalt before admixing, of a tar that is produced by the cracking of petroleum products such, for example, as a reformer tar of the type described in U. S. 2,258,-821 to Steininger et al. As set forth in detail in the said patent, these reformer tars result from treating straight run and cracked heavy naphthas under severe conditions, for example, under pressures from atmospheric to about 750 pounds per square inch and at temperatures from about 950° to 1250° F. Between about 2% and 25% of the reformer cracked tar based on the weight of the phthalic anhydride and preferably about 10% has been found to greatly increase the purity of the phthalic anhydride product. The reformer cracked tar contains unsaturated compounds.

Preferred asphalts are those which constitute an oxidized vacuum reduced residuum from a cracking or other refining or hydrocarbon conversion operation and are those which exhibit low volatility loss and high fluidity at the purification treatment temperatures. Asphalts found to be most suitable for the process have a softening point of 38° to 96° C., a penetration at 25° C. between 200 and 2, a specific gravity at 15° C. of not less than 1, at flash point (open cup method) of not less than about 226° C., volatility loss upon heating 50 grams of the asphalt at 163° C. for 5 hours (as determined by A. S. T. M. method D6–39T) of less than about 0.5%, and a solubility in carbon tetrachloride of not less than 96%.

A fraction of asphalt has been found to be individually effective in the purification of phthalic anhydride. This fraction, termed "asphaltenes" is commonly defined as that portion of asphalt which is soluble in carbon disulfide and carbon tetrachloride, but is insoluble in ether or paraffin oils, e. g., pentane. As will be demonstrated in a specific example hereinafter given, the asphaltene fraction is substantially as effective in the purification of phthalic anhydride as the total portion of asphalt from which the said asphaltenes are taken. These asphaltenes are effective in spite of the fact that they are generally considered to be unreactive, highly condensed polycyclic saturated hydrocarbons which may contain small amounts of sulfur or oxygen.

In some instances, however, in spite of low volatility losses, a very small amunt of overhead oil may be derived from the asphalt and be condensed with the purified phthalic anhydride. These oils can readily be removed by admixing a light hydrocarbon solvent having between about 3 and 8 carbon atoms per molecule with the phthalic anhydride in amounts from about 1 to 10 parts and preferably 2 parts by weight of hydrocarbon based on the phthalic anhydride. The purified phthalic anhydride can be recovered from the slurry by filtration and be dried by heated air or other means.

Operation of the present process according to this invention contemplates the employment of crude vaporous phthalic anhydride prepared in the catalytic oxidation of naphthalene, a substituted naphthalene or orthoxylene as a feed stock. In those instances where the crude vaporous phthalic anhydride contains a substantial proportion of naphthalene, naphthalene and product water can be distilled from the reaction product by refluxing the reaction products and effecting removal in the distilled vapors of naphthalene and product water. The vaporous crude phthalic anhydride is flowed into heated and molten asphalt and a mixture containing approximately 10 volumes of asphalt per volume of crude phthalic anhydride is maintained in a soaking drum at a temperature of preferably about 120° C. for a period, for example, about one-half hour, sufficient to effect complete purification of the phthalic anhydride. About 10% of a highly cracked reformer tar by weight based on the weight of the asphalt may be added to the admixture of asphalt and crude phthalic anhydride to facilitate the purification process. Thorough mixing of the crude phthalic anhydride and the treating agents is accomplished by convection but can be accomplished by stirring means introduced into the mixing vessel.

After the conclusion of this soaking period the molten asphalt containing the crude phthalic anhydride is pumped from the soaking drum and is introduced into a distillation zone under a vacuum equivalent to approximately 300 mm. of Hg absolute pressure. Phthalic anhydride is liberated during the said distillation and is released to atmospheric pressure in a condensing chamber of typical design employed in the production of phthalic anhydride. The condenser is conventional, of large volume and contains baffles to aid in the precipitation of phthalic anhydride from the product vapors. The vapors from which the phthalic anhydride is condensed are cooled in the condensing zone to substantially atmospheric temperature by conventional means. To remove small amounts of contaminating overhead asphaltic oil the condensed phthalic anhydride may be thereafter introduced into a slurry of a light oil, for example hexane. The hexane is employed in from about 1 to 10 parts by volume and preferably about 2 parts per volume of phthalic anhydride. The phthalic anhydride which is insoluble in the wash liquid is slurried therewith and thereafter the phthalic anhydride is filtered from the hexane and is air dried. This purified phthalic anhydride is a white crystalline substance melting at 130.8° C. and having a specific gravity of 1.527. The hexane wash which is employed primarily to remove any light oil which may have distilled over with the phthalic anhydride, may, after having been filtered from the slurry, be recycled to further quantities of phthalic anhydride.

The following specific examples illustrate the present invention, especially with respect to removal of maleic anhydride from phthalic anhydride.

*Example 1*

As asphalt produced by the air-blowing at elevated temperatures of a residual tar from thermal cracking operations, and having a ring and ball softening point at 79° C., a penetration at 25° C. of 2, a specific gravity at 15° C. of 1.13, a flash point of 296° C., a volatility loss (as determined by the ASTM method, D6–39T) of 0.1%, solubility in carbon tetrachloride of 98.3%, and a furol viscosity at 194° C. of 250 seconds was heated to a temperature of 121° C. and to 100 grams of same were added 10 grams of phthalic anhydride containing 10% by weight of maleic anhydride. Substantially immediately the pressure over the mixture was reduced to about 300 mm. Hg while the temperature was slowly raised to 204° C. over a period of about 30 minutes. Throughout the said period, sublimed purified phthalic anhydride was collected overhead. The so purified phthalic anhydride was found by iodimetric analysis to contain 1.3% by weight of maleic anhydride.

*Example 2*

In this example a more complete purification was obtained by the use also of a tar of the type hereinbefore referred to and described in the U. S. Patent 2,258,821 to Steininger et al. The asphalt employed in this example was produced by the air-blowing, at elevated temperatures, of a residual tar from thermal cracking operations. The asphalt bed had a softening point of 89° C., a penetration at 25° C. of 1, a specific gravity at 15° C. of 1.13, a flash point of 302° C., a volatility loss (ASTM D6–39T) of 0.1%, a solubility in carbon tetrachloride of 96.5%, and a furol viscosity at 177° C. of 140 seconds. To 100 grams of the said asphalt containing also 10 grams of the said tar was added 10 grams of phthalic anhydride containing 5% by weight of maleic anhydride. The total mixture was heated for one hour at 149° C. and the absolute pressure was then reduced to 300 mm. of mercury. The temperature of the admixture at the reduced pressure was slowly raised to 177° C. Substantially a quantitative yield of phthalic anhydride was obtained by sublimation from the asphalt bath. At least a portion of the sublimed phthalic anhydride was slightly yellowish because of a contamination with oil distilled over from the asphalt-tar mixture. This oil was removed by slurrying the phthalic anhydride with 2 parts of hexane. The phthalic anhydride was separated from the hexane by a filtration step and was then dried for a short time at 65° C. The purified phthalic anhydride obtained in this manner was white in color and had a maleic anhydride content of 0.4%.

*Example 3*

A fraction of asphaltenes was obtained by dissolving an oxidized cracked residual asphalt in hexane. The precipitated material constituting the asphaltenes was filtered from the solution. Ten grams of phthalic anhydride containing 10% of maleic anhydride was mixed with 35 grams of these asphaltenes. The mixture was heated to a temperature of 120° C. and the pressure was then reduced to 300 mm. of mercury. The sublimed product was collected overhead while the temperature was slowly raised to 240° C. By iodimetric analysis the product was found to contain only 0.2% by weight of maleic anhydride.

The run was repeated using a crude phthalic anhydride containing 5.0% of maleic anhydride, and exactly the same conditions were employed as those used above. The overhead product contained only 0.2% by weight maleic anhydride. The above noted 35 grams of asphaltenes are equivalent to 100 grams of asphalt. The use of asphaltenes instead of total asphalt offers the advantage of lowering the quantities required, but foaming may be encountered which, unless controlled, may render product recovery more difficult.

The present process can be set up so as to operate continuously by providing a pair of parallel treating zones. After impure phthalic anhydride has been introduced into one of these zones and admixed therein with asphalt and preferably tar and the soaking has begun, the phthalic anhydride can then be flowed into the other of the said two parallel treating zones and a similar admixture be accomplished. After treatment is concluded according to the present invention in the first said zone, substantially pure phthalic anhydride vapors will have been sublimed from the asphalt contained therein, and asphalt containing maleic anhydride will be drained therefrom. Asphalt free of maleic anhydride will be introduced into the said zone and thereafter another quantity of impure phthalic anhydride will be admixed therewith. Such a system of parallel treating zones can be so arranged that vaporous phthalic anhydride can be flowed, without a condensation step, directly from a catalytic oxidation process into contact with asphalt in the said zones. A continuous process is, therefore, provided for manufacturing substantially pure phthalic anhydride from naphthalene, methyl naphthalene or orthoxylene or like starting materials.

Having now described our invention, we claim the following:

1. A process of purifying phthalic anhydride that has been prepared by the catalytic vapor phase oxidation of aromatic compounds, the said process comprising the steps of mixing impure phthalic anhydride with at least the asphaltenic constituent of molten asphalt, maintaining the admixture at elevated temperatures for a time sufficient to effect substantial purification of the phthalic anhydride by the said molten asphalt, raising the temperature of the admixture and separating as overhead substantially pure phthalic anhydride.

2. The process of claim 1 in which the asphalt is obtained by the reduction of a residue of a petroleum cracking process, said asphalt having a softening point in the range of 38° to 96° C., a penetration at 25° C. between about 200 and 2, a specific gravity at 15° C. of not less than 1, a flash point of not less than about 226° C., a volatility loss of less than about 0.5% and a solubility in carbon tetrachloride of not less than about 96%.

3. The process of claim 1 in which the asphalt is obtained by the reduction of or oxidation of a residue of a petroleum cracking process, said asphalt having a softening point in the range of 79° to 96° C., a penetration at 25° C. between about 200 and 2, a specific gravity at 15° C. of not less than 1, a flash point of not less than about 226° C., a volatility loss of less than about 0.5% and a solubility in carbon tetrachloride of not less than about 96%.

4. The process of claim 1 in which a naphtha reformer tar is added to the asphalt before the said admixing.

5. The process of claim 1 in which there is added to the asphalt between 2% to 25% by weight based on the asphalt of a naphtha reformer tar and contains unsaturated compounds.

6. The process of claim 1 in which the asphaltenes content of an asphalt is separated therefrom by dissolving the asphalt in a light paraffinic solvent thereby precipitating the insoluble asphaltenes, the asphaltenes are filtered from the solution and wherein the said asphaltenes are admixed with the said impure phthalic anhydride, the said asphaltenes being in amount substantially equal to the amount of asphaltenes that would be added in unseparated asphalt.

7. A process of purifying phthalic anhydride that has been prepared by the catalytic vapor phase oxidation of aromatic compounds, the said process comprising the steps of mixing one part by weight of the impure phthalic anhydride with about ten parts by weight of a low-volatility-loss petroleum asphalt, maintaining the admixture for about one hour at a temperature between about 65° and 120° C., thereafter raising the temperature to between 120° and 260° C. and reducing the absolute pressure over the admixture to substantially less than atmospheric and separating as overhead substantially pure phthalic anhydride.

8. A process of purifying phthalic anhydride that has been prepared by the catalytic vapor phase oxidation of aromatic compounds, the said process comprising the steps of mixing one part by weight of the impure phthalic anhydride with about ten parts by weight of low-volatility-loss petroleum asphalt containing unsaturated hydrocarbons, maintaining the admixture for about one hour at a temperature between about 65° and 120° C., thereafter raising the temperature to between 120° and 260° C. and reducing the absolute pressure over the admixture to substantially less than atmospheric, subliming overhead phthalic anhydride from the asphalt mixture, admixing so-obtained solid phthalic anhydride with from about 1 to 10 parts by weight of a hydrocarbon having from about 3 to 8 carbon atoms per molecule, and separating from a slurry of hydrocarbon and product and drying a substantially pure phthalic anhydride.

9. The process of claim 8 in which there is added to the asphalt between 2% to 25% by weight based on the asphalt of a naphtha reformer tar obtained as a bottoms product of subjecting a naphtha to pressures of the order of 750 pounds per square inch and at temperatures from about 950° to about 1250° F. and contains unsaturated compounds.

MATHEW L. KALINOWSKI.
FREDERICK HAVILAND MacLAREN.

References Cited in the file of this patent
UNITED STATES PATENTS

| Number | Name | Date |
| --- | --- | --- |
| 965,147 | Feld | July 19, 1910 |
| 1,424,138 | Bailey | July 25, 1922 |
| 2,105,911 | Foster | Jan. 18, 1938 |
| 2,347,626 | Bradley | Apr. 25, 1944 |
| 2,578,326 | Toland | Dec. 11, 1951 |